US009927062B2

(12) United States Patent
Sheppard (10) Patent No.: US 9,927,062 B2
(45) Date of Patent: Mar. 27, 2018

(54) SYSTEMS AND METHODS ASSOCIATED WITH AN AUXILIARY SUPPORT FOR A DISPLAY DEVICE

(71) Applicant: Daniel William Sheppard, Kyle, TX (US)

(72) Inventor: Daniel William Sheppard, Kyle, TX (US)

( * ) Notice: Subject to any disclaimer, the term of this patent is extended or adjusted under 35 U.S.C. 154(b) by 0 days.

(21) Appl. No.: 15/490,673

(22) Filed: Apr. 18, 2017

(65) Prior Publication Data

US 2018/0023750 A1    Jan. 25, 2018

Related U.S. Application Data

(60) Provisional application No. 62/365,262, filed on Jul. 21, 2016.

(51) Int. Cl.
| | |
|---|---|
| A47G 1/24 | (2006.01) |
| F16M 11/16 | (2006.01) |
| F16M 13/02 | (2006.01) |
| A47B 23/00 | (2006.01) |
| F16M 11/10 | (2006.01) |

(52) U.S. Cl.
CPC ............. *F16M 11/16* (2013.01); *A47B 23/00* (2013.01); *F16M 11/10* (2013.01); *F16M 13/022* (2013.01)

(58) Field of Classification Search
CPC ...... F16M 11/16; F16M 11/10; F16M 13/022; A47B 23/007; A47B 19/06; A47B 19/002
USPC ......... 248/457, 454, 274.1, 309.1, 917, 919; 361/679.21, 679.27, 825
See application file for complete search history.

(56) References Cited

U.S. PATENT DOCUMENTS

| | | | | |
|---|---|---|---|---|
| 8,453,980 | B2 * | 6/2013 | Sapper | F16M 11/10 248/121 |
| 8,746,642 | B2 * | 6/2014 | Molter | F16M 11/10 248/284.1 |
| 8,891,232 | B2 * | 11/2014 | Wang | G06F 1/1637 248/121 |
| 9,109,742 | B2 * | 8/2015 | Smith | F16M 11/10 |
| 2007/0007413 | A1 * | 1/2007 | Jung | F16M 11/10 248/284.1 |
| 2014/0091194 | A1 * | 4/2014 | Miller | A47B 97/08 248/457 |

* cited by examiner

*Primary Examiner* — Todd M Epps
(74) *Attorney, Agent, or Firm* — Pierson IP, PLLC (57) ABSTRACT

Examples of the present disclosure relate to methods and systems associated with an auxiliary support for a display device. More particularly, embodiments are related to a hinged auxiliary support that is configured to be positioned between the display device and a display stand.

15 Claims, 8 Drawing Sheets

SYSTEMS AND METHODS ASSOCIATED WITH AN AUXILIARY SUPPORT FOR A DISPLAY DEVICE

CROSS-REFERENCE TO RELATED APPLICATIONS

This application claims a benefit of priority under 35 U.S.C. § 119 to Provisional Application No. 62/365,262 filed on Jul. 21, 2016, which is fully incorporated herein by reference in their entirety.

BACKGROUND INFORMATION

Field of the Disclosure

Examples of the present disclosure relate to methods and systems associated with an auxiliary support for a display device. More particularly, embodiments are related to a hinged auxiliary support that is configured to be positioned between the display device and a display stand.

Background

A display stand is a supportive bracket or arm designed to hold and secure a display screen in place. Different display stands have different purposes and functionality. For example, a display stand may move the display device vertically, rotate, tilt, retract, and/or swivel.

Over time display stands become less study, such that the display stand can no longer support the display device over time. Specifically, display stands with a single mounting arm can lose their rigidity over time. This may be due to stress on the arm, weakened of coupling devices, etc. When a display stand is unable to support the weight of the display device at a desired viewing height, the display stand becomes obsolete, substandard, etc.

Accordingly, needs exists for more efficient and effective systems and methods for a hinged auxiliary support for a display device that is configured to be positioned between the display device and the display stand.

SUMMARY

Examples of the present disclosure relate to methods and systems associated with an auxiliary support for a display device. More particularly, embodiments are related to a hinged auxiliary support that is configured to be positioned between the display device and a display stand. Embodiments may be configured to allow a display device to be repositioned at a desired angle via a hinge on the auxiliary support, wherein the auxiliary support is configured to apply pressure to and/or receive pressure from the display device and the stand.

Embodiments may include a stand support, monitor support, and coupling mechanism. The stand support and monitor support are configured to be coupled together at their proximal ends and their distal ends. The proximal ends of the stand support and the monitor support form a hinged axis. The stand support and monitor support are configured to rotate at the hinge to increase and/or decrease a distance between the distal ends of the stand support and the monitor support.

In embodiments the stand support may include a first arm and first projection. The first arm may include a proximal end, attachment groove, and distal end. The first projection may be positioned on a distal end of the first arm.

A proximal end of the stand support may be configured to be coupled with a proximal end of monitor support to form an axis of rotation between the stand support and the monitor support.

The attachment groove may be a channel, slot, etc. positioned between the proximal end and the distal end of first arm. The attachment groove may be configured to receive a mounting arm associated with a stand. Specifically, the mounting arm of the stand may be configured to slide into the attachment groove such that sidewalls associated with the attachment groove and an outer surface of the first arm are positioned adjacent to the mounting arm.

The first projection may be positioned on the distal end of the stand support. The first projection may be a projection extending away from the first arm, wherein the first projection includes a concave curvature. An orifice may be positioned at a second end of the first projection, wherein the orifice is configured to receive the coupling mechanism at a fixed position to selectively couple the distal ends of the stand support and the monitor support.

In embodiments the monitor support may a second arm and a second projection. The second arm may include a proximal end and distal end. The second projection may be positioned on a distal end of the second arm.

A proximal end of the monitor support may be configured to be coupled with a proximal end of stand support to form the axis of rotation between the stand support and the monitor support. Specifically, a shaft may be configured to be inserted through both proximal ends to couple the monitor support and the stand support at a first location. The first location may be an axis of rotation between the two supports, wherein an angle between the stand support and the monitor support may increase or decrease based on a desired viewing angle of the display device.

The second projection may be positioned on a distal end of the monitor support. The second projection may be a projection extending away from the second arm, wherein the second projection includes a concave curvature that mirrors that of the first projection. The second projection may include a slot that extends between the first end and the second end of the second projection. The slot may be configured to receive the coupling mechanism at various positions based on the angle between the stand support and the monitor support.

The coupling mechanism may include a shaft and knob. The coupling mechanism maybe a device that is configured to selectively couple the first projection and the second projection based on the positioning of the shaft within the slot. The coupling mechanism may be configured to be in an unlocked and locked mode.

In the unlocked mode, the slot may move relative to the shaft, such that the shaft may be repositioned between the first end and the second end of the slot. This may dynamically alter an angle between the first arm and the second arm.

In the locked mode, the slot may be fixed in place relative to the shaft, such as the angle between the first arm and the second arm may not be changed. Additionally in the locked mode, the second projection may not move relative to the first projection. In embodiments, the coupling mechanism may change between the locked and unlocked mode based on interactions with the knob.

In embodiments, based on the angle between the first arm and the second arm, a user may be able to adjust the viewing angle of the display device. Furthermore, the auxiliary support may assist a mounting arm associated with the display device in maintaining the desired viewing angle of the display device.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present disclosure. Also, common but well-understood elements that are useful or necessary in a commercially feasible embodiment are often not depicted in order to facilitate a less obstructed view of these various embodiments of the present disclosure.

DETAILED DESCRIPTION

In the following description, numerous specific details are set forth in order to provide a thorough understanding of the present embodiments. It will be apparent, however, to one having ordinary skill in the art that the specific detail need not be employed to practice the present embodiments. In other instances, well-known materials or methods have not been described in detail in order to avoid obscuring the present embodiments.

Figure 1:
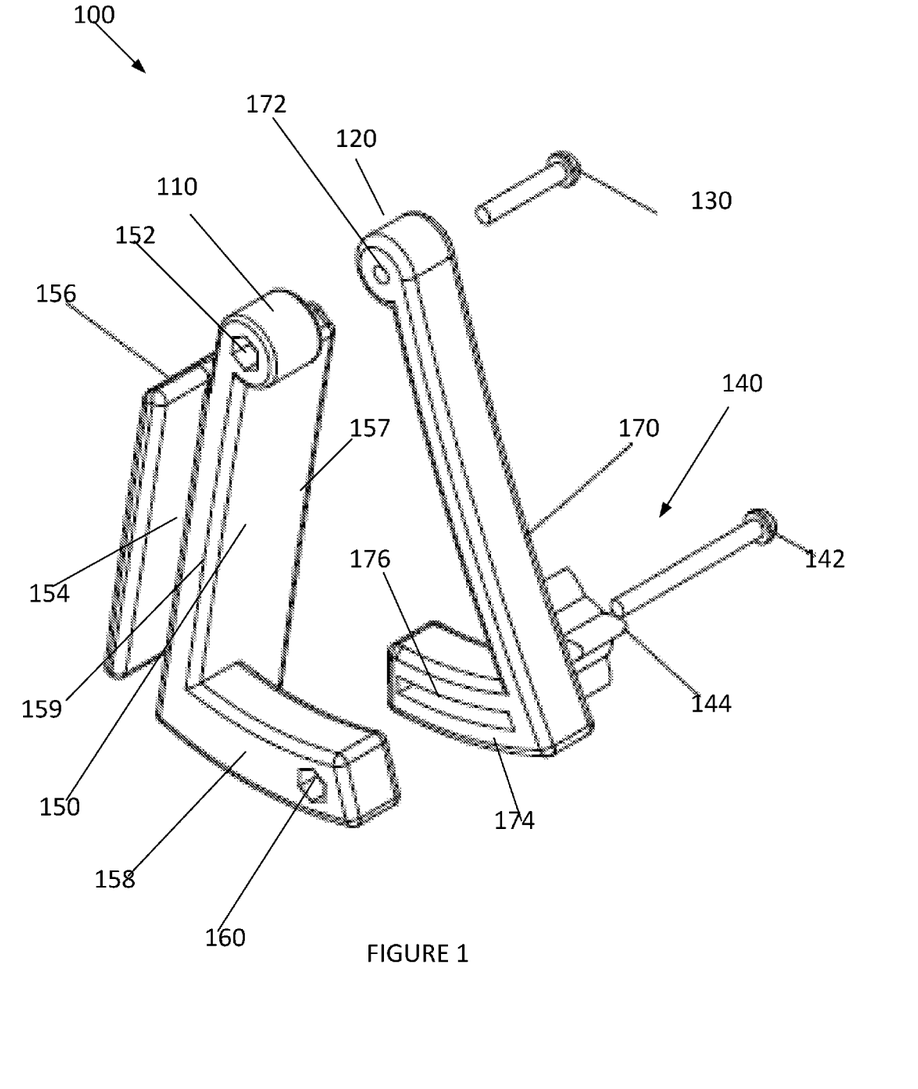
FIG. 1 depicts an exploded view of an auxiliary support that is configured to apply pressure to a display device and a monitor support, according to an embodiment.

FIG. 1 depicts an exploded view of an auxiliary support 100 that is configured to apply pressure to a display device and a display stand, according to an embodiment. The stand may be configured to secure the display device at a desired angle. However, overtime the stand may lose its effectiveness causing the display device to move downward. To alleviate this issue, the auxiliary support 100 may be configured to be positioned between a rear surface of the display device and the stand. Specifically, auxiliary support may be positioned proximate to an attachment point between the stand and the display device. This may limit the movement of the display device relative to the stand. Auxiliary support 100 may include stand support 110, monitor support 120, hinge 130, and coupling mechanism 140.

Stand support 110 may have a proximal end, first arm 150, and a distal end. Stand support 110 may be a fixed support that is not configured to move. A proximal end of stand support 110 may include an orifice 152, which is configured to extend through the proximal end of stand support 110. The proximal end of stand support 110 may be configured to be coupled to the proximal end of monitor support 120 at a fixed location via hinge 130.

First arm 150 may be a projection that extends from the proximal end to the distal end of stand support 110. In embodiments, first arm 152 may be a planar projection. However, in other embodiments, first arm 152 may be a curved projection. First arm 150 may have a first width, wherein the first width is longer than a width associated with orifice 152 and first projection 158. First arm 150 may include attachment sidewall 156 and attachment groove 154.

Attachment sidewall 156 may be laterally offset from the outer surface of first arm 150, and have a substantially similar linearity or curvature as the outer surface of first arm 150. Attachment sidewall 156 may be coupled to first arm 150 via a lateral sidewall positioned on a first edge 157 of first arm 150. Attachment sidewall 156 may extend from the distal end of first arm 150 towards the proximal end of first arm 150. In embodiments, attachment sidewall 156 may extend along the entire length of first arm 150 or only a portion of the length of first arm 150.

Attachment groove 154 may be may be positioned between an outer surface of first arm 150 and attachment sidewall 156. The width of attachment groove 154 may extend across the entirety of the width of first arm 150. Attachment groove 154 may form a chamber, cavity, etc. that is configured to receive a mounting arm associated with a display device. Specifically, the mounting arm for the display device may be configured to slide into attachment groove 154, such that the mounting arm is positioned between the outer surface of first arm 150 and attachment sidewall 156. Responsive to sliding the mounting arm into attachment groove 154, the mounting arm may be coupled with first arm 150.

First projection 158 may be positioned on the distal end of first arm 150, wherein first projection 158 may be a projection extending away from an inner surface of first arm 150. In embodiments, an outer edge of first projection 158 may be aligned with a second edge 159 of first arm 150. First projection 158 may have a concave curvature, and may include an orifice 160 positioned proximate to an end of first projection. Orifice 160 may be configured to receive shaft 142 at a fixed location to selectively couple first arm 150 and second arm 170, such that second arm 170 may be rotated in relation to first arm 150 to be reposition and also be locked in place. First projection 158 may have a width that is smaller than that of first arm 150.

Monitor support 120 may include a proximal end, second arm 170, and second projection 174. Monitor support 120 may be configured to move relative to a fixed stand support 110. The proximal end of monitor support 120 may include an orifice 172 that extends through the proximal end of monitor 120. In embodiments, the proximal end of monitor support 120 may be configured to be coupled to the proximal end of stand support 110 via hinge 130 extending through orifice 172. When coupled together, inner surfaces of the proximal ends may be coplanar. In embodiments, the width of the proximal ends of monitor support 120 and stand support 110 may be substantially equal to the width of first arm 150.

Second arm 172 may be a projection extending from the proximal end to the distal end of monitor support 120. Second arm 172 may have an inward curvature, wherein an outer surface of second arm 172 may be configured to be positioned adjacent to a rear surface of the display device. However, in other embodiments, second arm 172 may be a linear surface, which may conform to the shape of a rear surface of the display device. Second arm 172 may have a second width, which may be smaller than the first width of first arm 150.

Second projection 174 may be positioned on the distal end of monitor support 120. Second projection 174 may be a projection extending away from an inner surface of second arm 170, which may be towards stand support 110 and in an opposite direction than that of first projection 158. Second projection 176 may have a concave curvature, which is configured to mirror the curvature of first projection 158. In embodiments, the widths of first projection 158 and second projection 174 may be substantially equal to the width of first arm 150. Second projection 174 may include a slot 176 that extends between a first end and second end of second projection 174.

Slot 176 may have a curvature that is substantially similar to that of second projection 174. Slot 176 may be configured to receive shaft 142, such that shaft 142 may slide within slot 176 to be repositioned within slot 176. Furthermore, the curvature of slot 176 may allow monitor support 120 to rotate in a curved arc while remaining coupled to stand support 110.

Hinge 130 may be a mechanical bearing that is configured to couple stand support 110 with monitor support 120, while allowing for a limited angle of rotation between the parts. The angle of rotation may be limited based on the sizing of slot 176. Hinge 130 may be configured to allow monitor support 120 to rotate relative to stand support 110 about a fixed axis of rotation, which may be defined by the longitudinal axis of hinge 130. In embodiments, hinge 130 may be configured to extend through orifice 152 associated with stand support 110 and orifice 172 associated with monitor support 120.

Coupling mechanism 140 may be a device that is configured to selectively couple first projection 158 with second projection 174, such that auxiliary support 100 may move from a locked mode to an unlocked mode. In the locked mode, second projection 174 may not be able to rotate relative to first projection 160. In the unlocked mode, second projection 174 may be able to rotate relative to first projection 158. Coupling mechanism 140 may include shaft 142 and knob 144.

Shaft 142 may be a cylindrical projection that is configured to extend through knob 144, orifice 160, and slot 174. Responsive to sliding shaft 142 through orifice 160 and slot 174, monitor support 120 may be configured to rotate relative to stand support 110 by repositioning shaft 142 within slot 176. More specifically, to decrease an angle between monitor support 120 and stand support 110, slot 176 may move relative to shaft 142, while shaft 142 remains fixed in place. To increase an angle between monitor support 120 and stand support 110, slot 176 may move relative to shaft 142, such that shaft is placed in a position within slot 176 that is further away from second arm 172. In embodiments, the maximum and minimum angle of rotation between monitor support 120 and stand support 110 may be based in part on the length of slot 174 and the positioning of shaft 142 within slot 176.

Knob 144 may be configured to control slot's 176 ability to move relative to shaft 142. Knob 144 may be configured to lock first projection 158 and second projection 174 in place, and also be configured to unlock second projection 174, such that shaft 142 can be repositioned within slot 176. In an embodiment, responsive to rotating knob 144 in a first direction, shaft 142 may be locked in place at a first location with slot 176. Responsive to rotating knob 144 in a second direction, second projection 174 may be unlocked. As such, via knob 144, monitor support 120 may be configured to selectively move and be locked in place with respect to stand support 110.

Figure 2:
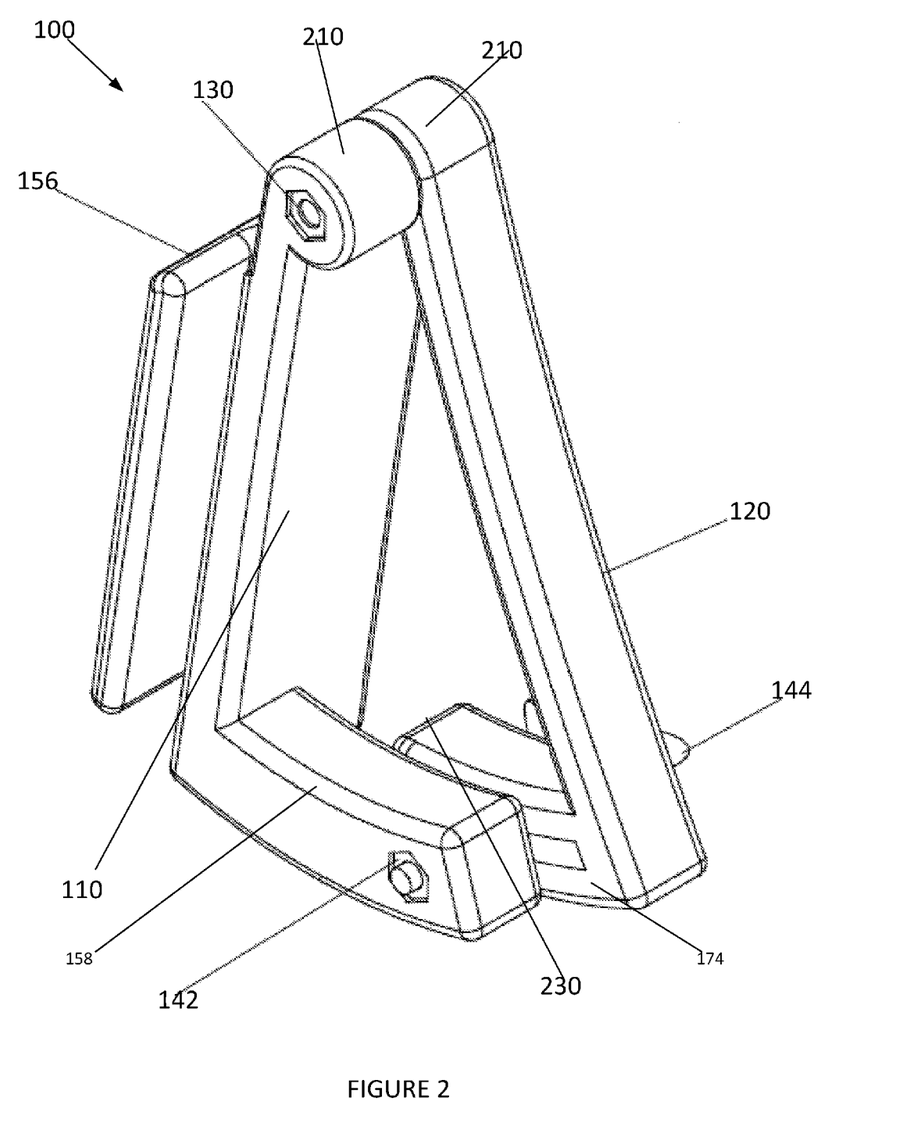
FIG. 2 depicts an auxiliary support, according to an embodiment.

FIG. 2 depicts an auxiliary support 100 that is configured to apply pressure to a display device and a monitor support, according to an embodiment. Elements depicted in FIG. 2 may be described above, and for the sake of brevity another description of the elements are omitted.

As depicted in FIG. 2, a proximal end 210 of stand support 120 may be coplanar with a proximal end 220 of monitor support 220. The total widths of the proximal ends 210, 220 may be substantially similar to the width of first arm 120. Additionally, the inner surfaces of first projection 158 and second projection 174 may be coplanar.

Furthermore, an end 230 of second projection 174 may limit the rotation of stand support 110 in relation to monitor support 120. More specifically, responsive to positioned end 230 adjacent to the inner surface of first arm 110, monitor support 120 may no longer be able to rotate and reduce the angle between monitor support 110 and stand support 120.

Figure 3:
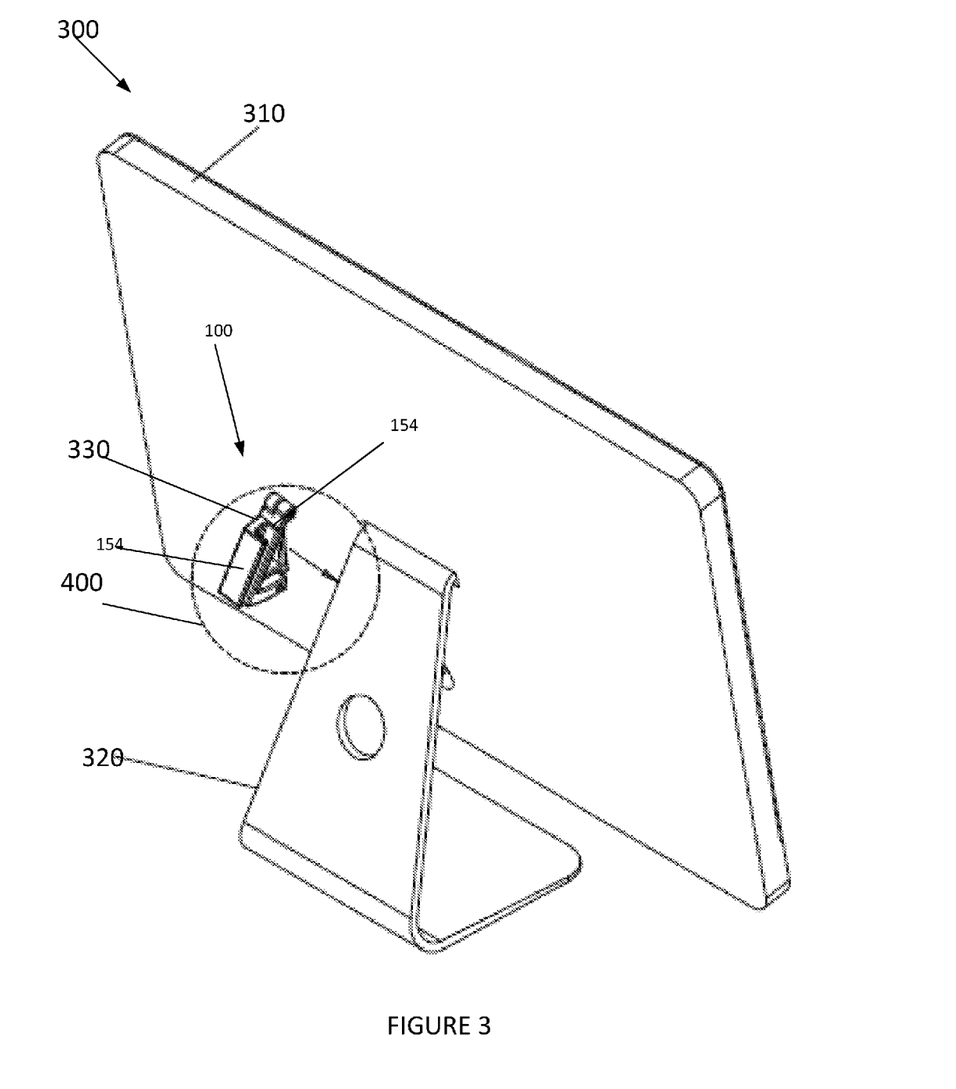
FIG. 3 depicts an auxiliary support along with a display device and a stand, accordingly to an embodiment.

FIG. 3 depicts auxiliary support 100 along with a display device 310 and a stand 320, accordingly to an embodiment. Elements depicted in FIG. 3 may be described above, and for the sake of brevity another description of the elements are omitted.

Display device 310 may be a monitor, frame, computer screen, tablet computer, or any other device that may be braced in place. Stand 320 may be a device that is configured to be affixed to a rear surface of display device 310 to support display device 310 at a desired angle, position, etc. Stand 320 may be comprised of a single arm or multiple arms.

As depicted in FIG. 3, auxiliary device 100 may be configured to be inserted between display device 310 and stand 320. Responsive to inserting stand 320 into attachment groove 154, an edge of stand 320 may be positioned adjacent to lateral sidewall 330, a rear face of stand 320 may be positioned adjacent to attachment sidewall 154, and a front face of stand 320 may be positioned adjacent to an outer surface of first arm 170.

In embodiments, the proximal ends of monitor support 120 and stand support 110 may be positioned adjacent to or near a pivot point between display device 310 and stand 320. By locking auxiliary support 100 at the pivot point, the downward and/or upward motion of display device 310 may be limited.

Figure 4:
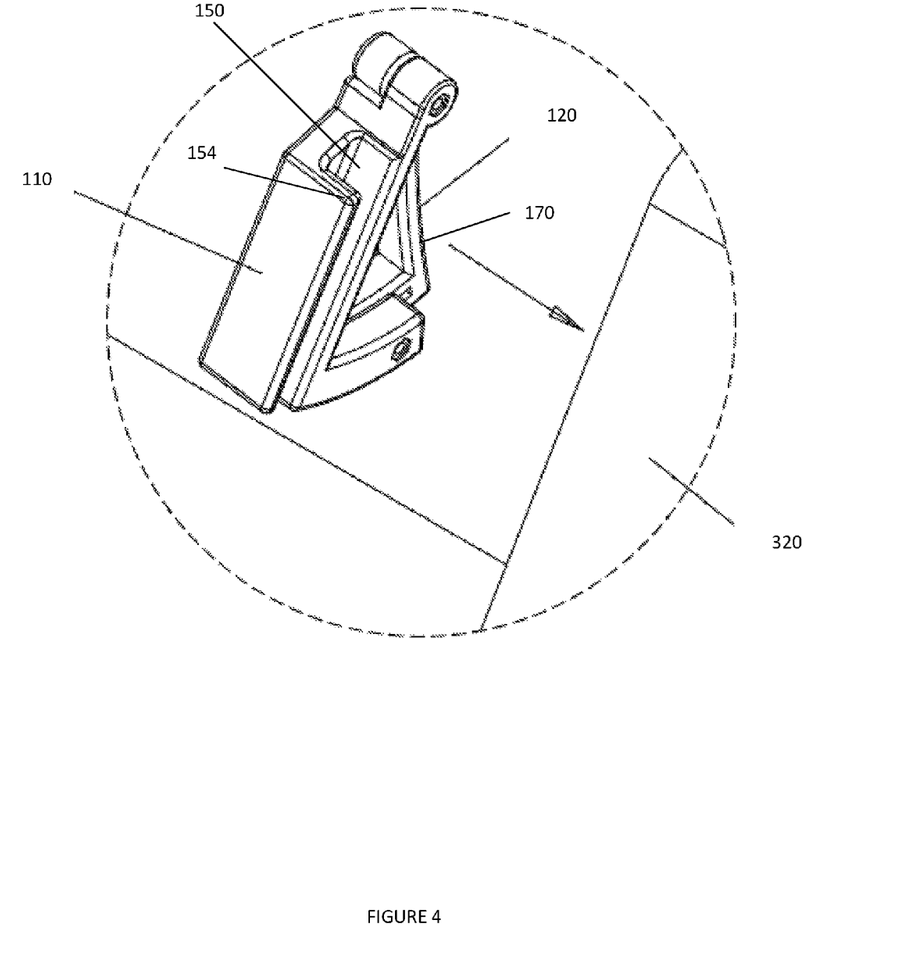
FIG. 4 depicts an auxiliary support, according to an embodiment.

FIG. 4 depicts auxiliary support 100 along with a display device 310 and a stand 320, accordingly to an embodiment. Elements depicted in FIG. 4 may be described above, and for the sake of brevity another description of the elements are omitted.

As shown in FIG. 4, the rear surface of first arm 150 and attachment sidewall 154 may be linear surfaces that are configured to engage with a linear mounting arm. However, in other embodiments, first arm 150 and attachment sidewall

154 may be curved surfaces that may be configured to engage with curved mounting arms.

Furthermore, second arm 170 may have a bowed inward, curved surface that is configured to interface with the rear surface of a monitor. This may enable the outer surface of second arm 170 to correspond with the curvatures of display devices. However, in other embodiments, second arm 170 may be a linear surface configured to engage with display devices with flat backings.

Figure 5:
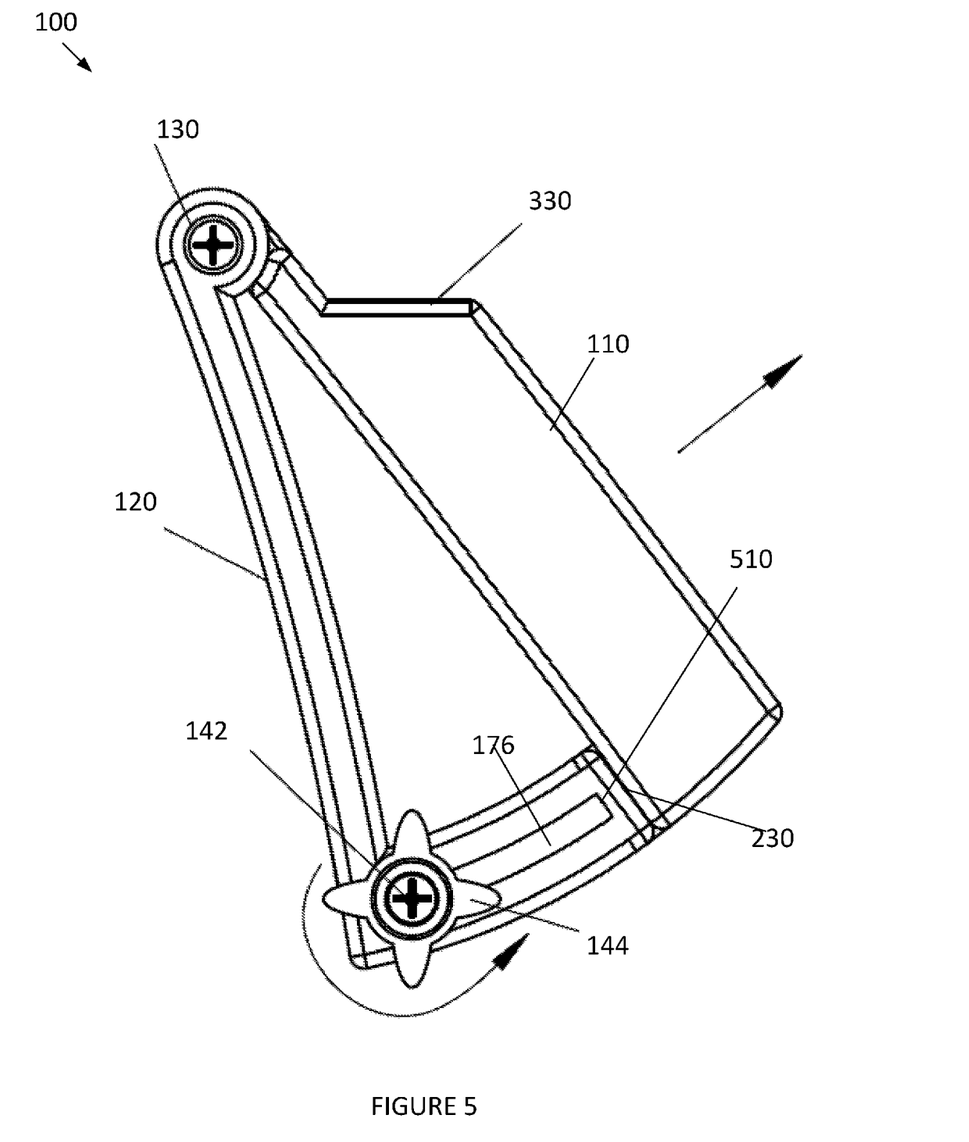
FIG. 5 depicts an auxiliary support, according to an embodiment.

FIG. 5 depicts auxiliary support 100, accordingly to an embodiment. Elements depicted in FIG. 5 may be described above, and for the sake of brevity another description of the elements are omitted.

More specifically, FIG. 5 depicts a minimal angle of between monitor support 120 and stand support 110, which is based on the positioned of shaft 142 within slot 176. Responsive to rotating knob 144 in a first direction to unlock the coupling mechanism, shaft 142 may remain fixed in place within the first projection while second projection 174 moves away from stand support 110. As second projection 174 moves away from stand support 110, edge 230 associated with monitor support 120 may move away from the inner surface of stand support 110 allowing shaft 142 to be repositioned towards first end 510 of slot 176. This may allow the relative angle between monitor support 120 and stand support 110 to increase.

Furthermore, FIG. 5 depicts the curvature of monitor support 120 and the linearity of stand support 110.

Figure 6:
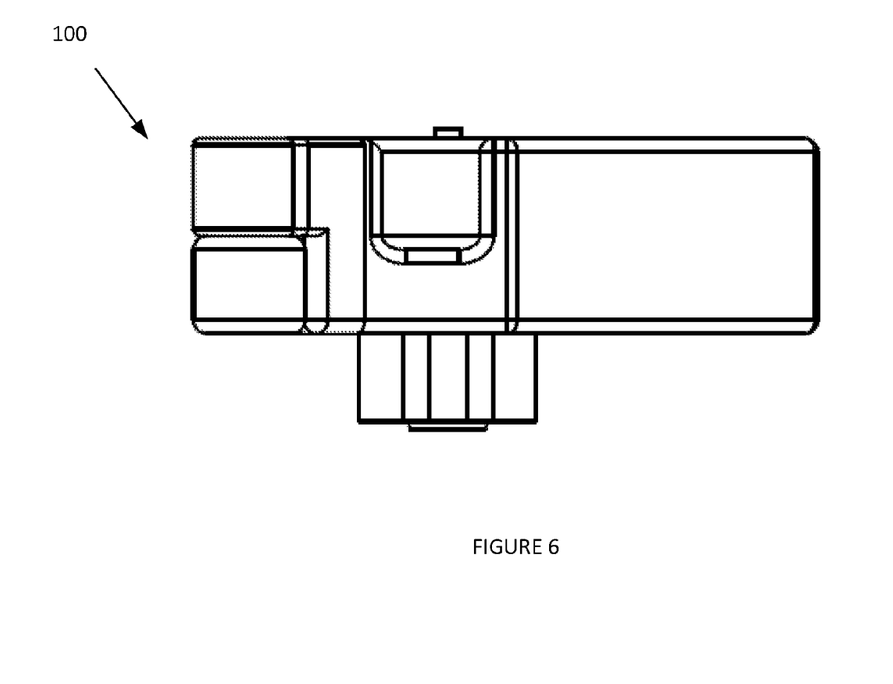
FIG. 6 depicts a top view of an auxiliary support, according to an embodiment.
Figure 7:
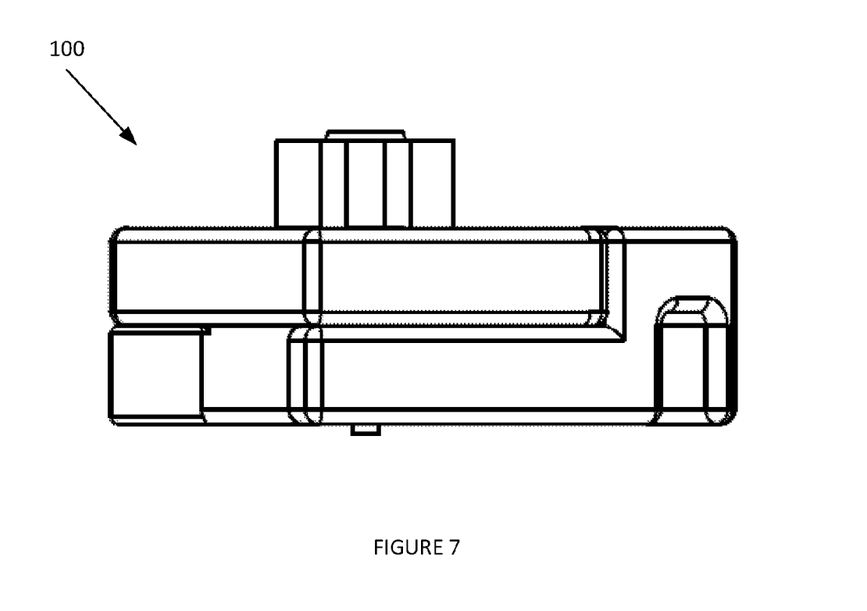
FIG. 7 depicts a bottom view of an auxiliary support, according to an embodiment.
Figure 8:
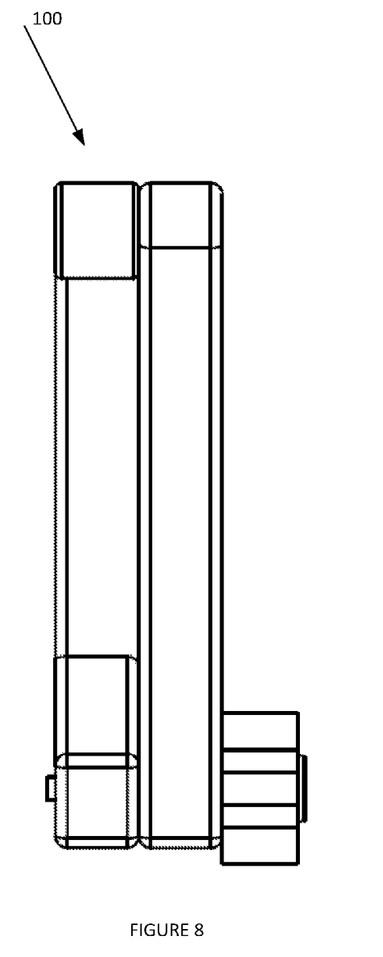
FIG. 8 depicts a first side view of an auxiliary support, according to an embodiment.
Figure 9:
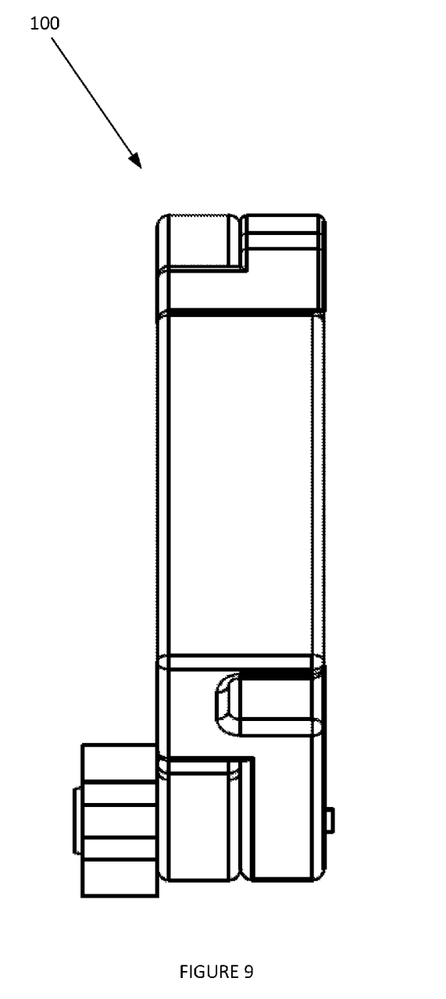
FIG. 9 depicts a second side view of an auxiliary support, according to an embodiment.

FIG. 6 depicts a top view of auxiliary support 100, according to an embodiment. FIG. 7 depicts a bottom view of auxiliary support 100, according to an embodiment. FIG. 8 depicts a first side view of auxiliary support 100, according to an embodiment. FIG. 9 depicts a second side view of auxiliary support 100, according to an embodiment.

Figure 10:
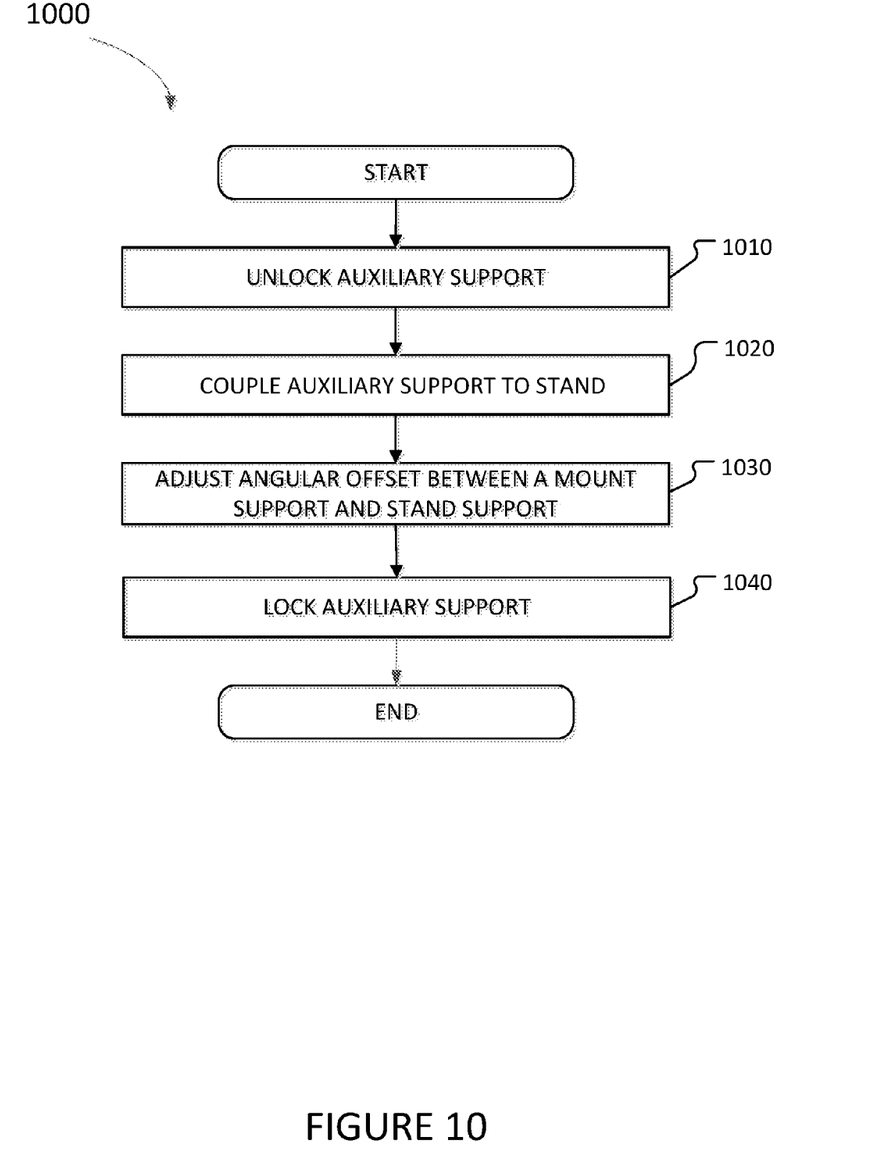
FIG. 10 illustrates a method for utilizing an auxiliary support to position a display device, according to an embodiment.

FIG. 10 illustrates a method 1000 for utilizing an auxiliary support to position a display device, according to an embodiment. The operations of method 1000 presented below are intended to be illustrative. In some embodiments, method 1000 may be accomplished with one or more additional operations not described, and/or without one or more of the operations discussed. Additionally, the order in which the operations of method 1000 are illustrated in FIG. 10 and described below is not intended to be limiting.

At operation 1010, an auxiliary support may be unlocked. The auxiliary support may be unlocked by loosening a locking mechanism to allow a slot associated with a second support about a shaft, wherein a first end of the shaft is fixedly coupled to a first support at a first location and a second end of the shaft is coupled to a locking mechnism. When the auxiliary support is unlocked, the second support may be configured to rotate about a pivot to change the positioning of the shaft within the slot to increase or decrease an angle between the first support and the second support.

At operation 1020, an edge of a stand may be coupled with the first support via an attachment groove. The stand may be coupled with the first support by sliding the attachment groove over portions of the edge of the stand. Additionally, an outer surface of the second support may be positioned adjacent to a rear surface of the display device. Proximal ends of the first support and the second support may be positioned adjacent to a coupling point between the stand and the display device.

At operation 1030, an angular offset of between the first support and the second support may be changed. The angular offset may be changed by moving the slot associated with the second support in relation to a fist shaft, while the shaft remains coupled to the first support at a fixed location. The angular offset may be selected based on a desired viewing angle of the display device.

At operation 1040, the auxiliary support may be locked in place such that the angular offset between the first support and the second support may not be changed. The auxiliary support may be locked by tightening a locking mechanism to disallow the second support to move relative to the first support.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale.

The flowcharts and block diagrams in the flow diagrams illustrate the architecture, functionality, and operation of possible implementations of systems, methods, and computer program products according to various embodiments of the present invention. In this regard, each block in the flowcharts or block diagrams may represent a module, segment, or portion of a process.

What is claimed is:

1. An auxiliary support for a display device comprising:
a first support including a first proximal end, a first arm, and a first projection, the first arm having a linear surface extending from the first proximal end to the first projection, the first projection being a projection extending away from a first inner surface of the first arm;
an attachment groove positioned on an outer surface of the first arm, the attachment groove being configured to receive an arm of a stand;
a second support having a second proximal end, a second arm, and a second projection, the second arm having a curved surface extending from the second proximal end to the second projection, the second projection being a projection extending away from a second inner surface of the second arm, the second projection including a slot extending between a first end of the slot and a second end of the slot;
a hinge configured to couple the first proximal end and the second proximal end;
a coupling mechanism configured to selectively couple the first projection and the second projection, the coupling mechanism including a shaft that is configured to be coupled to the first projection at a first location and be positioned at various locations within the slot.

2. The auxiliary support of claim 1, wherein the first projection and the second projection are curved projections.

3. The auxiliary support of claim 1, wherein the attachment groove is defined by a lateral sidewall, an attachment sidewall, and the outer surface of the first arm.

4. The auxiliary support of claim 3, wherein the attachment sidewall extends in parallel to the first arm.

5. The auxiliary support of claim 1, wherein the first arm has a first width, and the second arm has a second width, the first width being greater than the second width.

6. The auxiliary support of claim 1, wherein the slot is configured to move relative to the shaft to change an angular offset between the first support and the second support.

7. The auxiliary support of claim 6, wherein the angular offset between the first support and the second support increases as the slot moves relative to the shaft towards the first end of the slot, the first end of the slot being positioned closer to the second arm than the second end of the slot.

8. The auxiliary support of claim 7, wherein the shaft is coupled to the first projection at a fixed location.

9. The auxiliary support of claim 1, further comprising:
a knob configured to move the coupling mechanism between an unlocked mode and a locked mode, wherein in the unlocked mode the second projection moves relative to the first projection and in the locked mode the second projection is secured in place relative to the first projection.

10. The auxiliary support of claim 1, wherein the first proximal end and the second proximal end are configured to be positioned adjacent to a coupling point of the stand and the display device.

11. A method using an auxiliary support for a display device comprising:
coupling, via a hinge, a first proximal end associated with a first support with a second proximal end associated with a second support, the hinge defining an axis of rotation between the first support and the second support, the first support including the first proximal end, a first arm, and a first projection, the first arm having a linear surface extending from the first proximal end to the first projection, the first projection being a projection extending away from a first inner surface of the first arm, the second support having the second proximal end, a second arm, and a second projection, the second arm having a curved surface extending from the second proximal end to the second projection, the second projection being a projection extending away from a second inner surface of the second arm, the second projection including a slot extending between a first end of the slot and a second end of the slot;
inserting a stand within an attachment groove, the attachment groove being positioned on an outer surface of the first arm;
coupling a first end of a shaft with the first arm at a fixed location;
inserting the shaft through the slot to selectively coupling the first projection and the second projection;
moving the slot relative to the shaft to adjust an angular offset between the first arm and the second arm.

12. The method of claim 11, further comprising:
moving the slot relative to the shaft in an unlocked mode to change the angular offset between the first support and the second support.

13. The method of claim 12, further comprising:
moving the slot relative to the shaft towards the first end of the slot increases the angular offset between the first support and the second support, the first end of the slot being positioned closer to the second arm than the second end of the slot.

14. The method of claim 11, further comprising:
rotating a knob to move a coupling mechanism associated with the shaft between an unlocked mode and a locked mode, wherein in the unlocked mode the second projection moves relative to the first projection and in the locked mode the second projection is secured in place relative to the first projection.

15. The method of claim 11, further comprising:
positioning the first proximal end and the second proximal end adjacent to a coupling point of the stand and the display device.

* * * * *